E. HERR.
FEED MILL GOVERNOR.
APPLICATION FILED JUNE 4, 1913.

1,088,576.

Patented Feb. 24, 1914.
2 SHEETS—SHEET 1.

Witnesses
J. H. Crawford.
J. W. Garner.

Inventor
Edward Herr,
By Victor J. Evans
Attorney

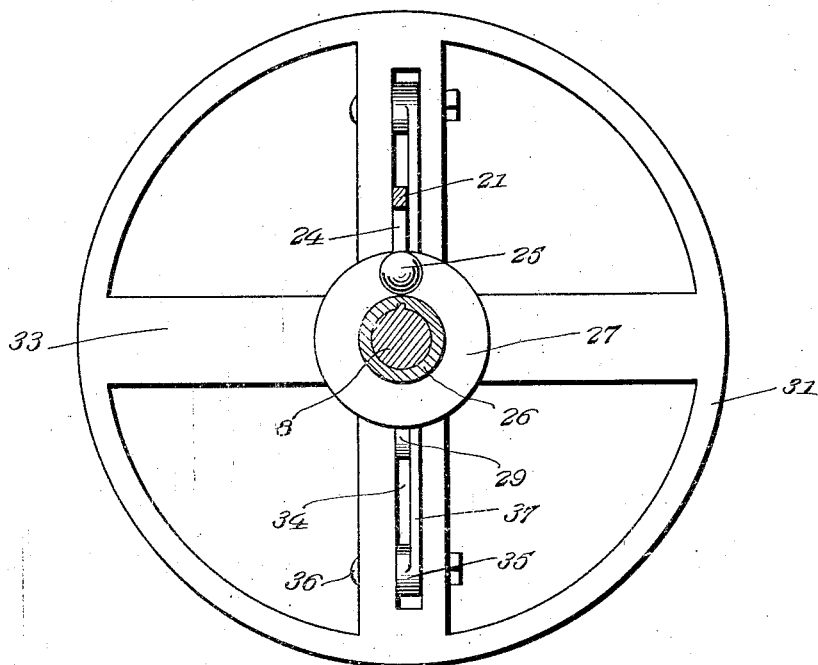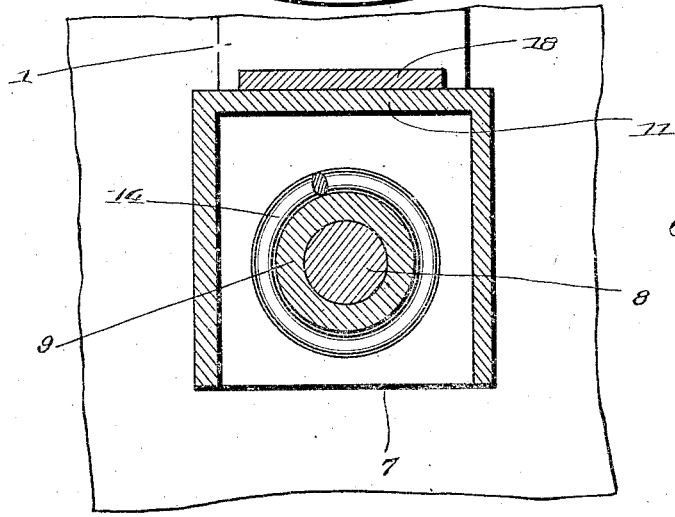

UNITED STATES PATENT OFFICE.

EDWARD HERR, OF BUTLER, SOUTH DAKOTA.

FEED-MILL GOVERNOR.

1,088,576.  Specification of Letters Patent.  Patented Feb. 24, 1914.

Application filed June 4, 1913. Serial No. 771,705.

*To all whom it may concern:*

Be it known that I, EDWARD HERR, a citizen of the United States, residing at Butler, in the county of Day and State of South Dakota, have invented new and useful Improvements in Feed-Mill Governors, of which the following is a specification.

This invention relates to improvements in feed mills and especially with reference to a governor for automatically regulating the valve of a mill of this kind to prevent the mill from being choked and also prevent it from being speeded to an undesirable extent by an under supply of grist, the invention consisting in the construction, combination and arrangement of devices hereinafter described and claimed.

Figure 1:
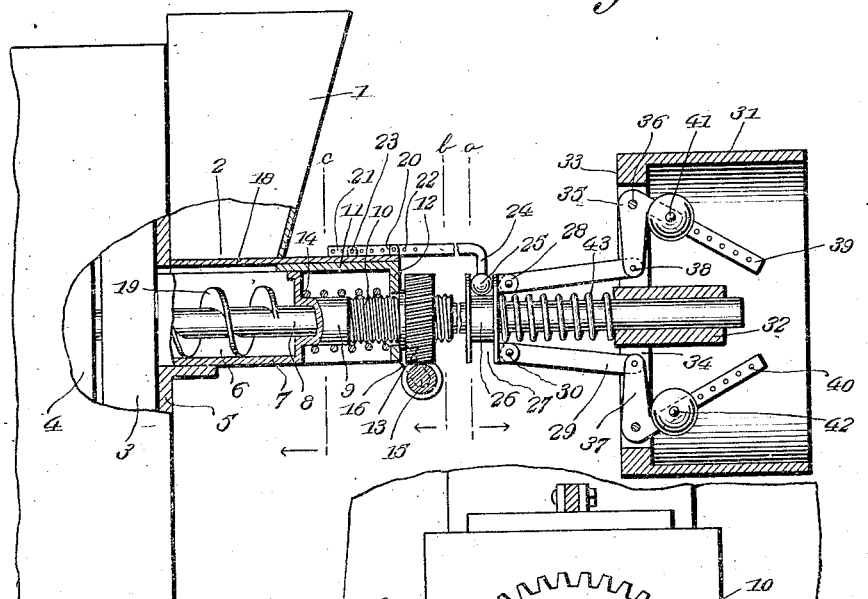
Figure 3:
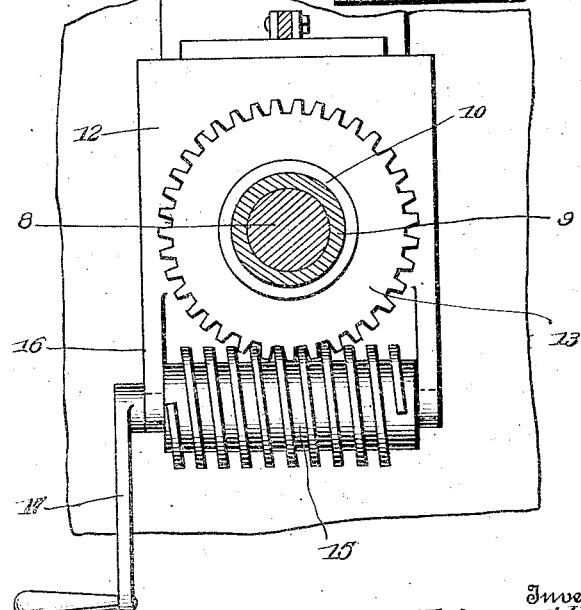

In the accompanying drawings:—Figure 1 is partly an elevation and partly a sectional view of a grist feed governor and bur adjusting mechanism constructed in accordance with my invention, showing the same in connection with a feed mill, a portion of the hopper and the stationary and running burs of which are diagrammatically represented. Fig. 2 is a detail sectional view of the same on the plane indicated by the line *a—a* of Fig. 1. Fig. 3 is a similar view on the plane indicated by the line *b—b* of Fig. 1. Fig. 4 is a similar view on the plane indicated by the line *c—c* of Fig. 1.

For the purposes of this specification, the hopper of a feed mill adapted to be operated by a small engine or other motor of moderate power is indicated at 1, the discharge opening of the hopper at 2, the stationary bur at 3 and the running bur at 4, the casing wall 5 of the hopper being shown as provided with an intake duct or trough 6 formed in an arm 7 which projects from one side of the casing.

The shaft 8 to which the running bur is attached has a bearing in a sleeve 9 which is formed at the outer end of the feed trough 6, the said sleeve being provided with a screw thread 10 which extends a suitable distance thereon from its outer end. That portion of the arm 7 beyond the trough or feed duct 6 is hollow and has a fixed plate 11 on its upper side. A follower 12 is arranged under the said plate and guided between the walls of the hollow portion of the arm and has an opening which is unthreaded and is of larger diameter than the bearing sleeve 9 and through which the latter extends so that the said follower is adapted to move longitudinally on the said bearing sleeve.

A worm gear 13 is threaded on the sleeve 9 and bears against the outer side of the follower. A coiled extensile spring 14 is arranged in the hollow portion of the arm and bears between the follower and the outer end of the feed duct or trough 6, the spring acting through the instrumentality of the follower and the worm gear 13 on the sleeve to press the stationary bur against the running bur and, hence, in effect the said worm gear by reason of its being threaded on the bearing sleeve 9 is an adjusting nut for the mill, as will be understood. This worm gear is engaged by a worm 15 the shaft of which is mounted in fixed bearings indicated at 16 and is provided with a crank 17 whereby the said worm may be turned to cause the worm gear to turn and, hence, adjust the burs of the mill, as may be required.

By the provision of the worm gear which serves as an adjusting nut for the mill burs and the provision of the worm which engages and operates the said worm gear there will be no tendency of the adjusting element, to wit: the worm gear 13 to turn casually after having been adjusted, and, hence, the mill will not casually get out of adjustment when provided with my improved adjusting worm gear and worm.

The valve 18 which regulates the passage of grist through the discharge opening of the hopper into the duct 6 and for engagement by the feed screw 19 with which the shaft 8 is provided is a longitudinally movable slide valve or plate 18 which is arranged on the upper side of the plate 11 which covers the hollow portion of the arm 7 and this feed valve is provided with two pairs of spaced upwardly extending lugs or ears 20 on its upper side, and which in practice, are preferably integral therewith.

The bar 21 is arranged between the ears 20 and has a series of adjusting openings 22 and pins or bolts 23 are passed through certain of said openings and through openings in the pairs of ears or lugs 20, so that the said bar is adjustably connected to the valve 18, as will be understood. At the outer end of the said bar is a down-turned arm 24 terminating in a spindle on which a substantially spherical roller 25 is mounted for revolution.

A collar 26 is splined on the shaft 8 for rotation therewith and longitudinal movement thereon and is provided with a peripheral annular groove 27 in which the roller 25 operates, the outer side of the collar being provided with diametrically opposed pairs of spaced lugs 28 between which are pivoted the inner ends of a pair of links 29 on pins 30.

The driving pulley 31 has a tubular hub 32 which is keyed or otherwise firmly secured to the shaft 8. The spokes 33 of the said pulley are here shown as at one side thereof, the side nearest the collar 26, and two of these spokes which are arranged diametrically opposite each other are provided with radial slots 34 in which are arranged a pair of bell crank levers 35, the pivots of the said levers being indicated at 36. Each of these bell crank levers has a short arm 37 which is substantially radial with respect to the driving pulley and operates in one of the slots 33, the inner ends of the said arms being pivotally connected as at 38 to the outer end of the links 29 and, hence, the bell crank levers are directly connected to the collar 26. Each bell crank lever also has a long arm 39 which is at an angle of about thirty-five degrees with respect to the shorter arm and is provided with a series of openings 40. These long arms 39 of the bell crank levers normally converge toward the outer side of the driving pulley and on the long arm of each bell crank lever is an adjustable weight 41, the said weights being adapted to be secured to the said arms of the bell crank levers by pins or other suitable devices 42 which pass therethrough and which may be arranged in any of the openings 40 of the long arms of the bell crank levers. A coiled spring 43 is arranged on the shaft 8 and bears between the pulley and the collar 26 and exerts its tension to push the collar inwardly toward the mill and, hence, cause the bar 21 to move therewith and close the valve 18.

When the mill is not in operation, the valve 18 is closed by the action of the spring 43 and its connections. When the mill is in operation, the bell crank levers are moved centrifugally by the weights 41 and caused to draw the collar 26 outwardly, against the tension of the spring 43 and to open the valve 18 to an extent dependent upon the speed of revolution of the pulley so that when the speed of the pulley diminishes, as when there has been an oversupply of material to the mill, the valve 18 is automatically closed to the required extent to diminish the supply of grist and when he speed of the pulley increases the valve 18 is automatically opened to a corresponding extent so as to cause an increased quantity of grist to be supplied to the mill. Hence, the governor operates automatically to regulate the supply of grist to the mill, prevents the mill from becoming choked and the engine or motor which drives the mill from becoming overloaded or stopped.

I claim:—

In a mill of the class described a casing having an arm projecting therefrom, said arm having its inner portion formed with a feed duct open at the upper side, and being further provided with a bearing at its outer end and with a fixed plate on its upper side at its outer end and above said bearing; a hopper arranged with its discharge throat above said feed duct and to discharge thereinto, a feed regulating valve arranged to slide on the fixed plate of the arm of the casing, a driving shaft extending through the feed duct and mounted in said bearing, a governor carried by the shaft and including a movable element, a collar revoluble with and longitudinally movable on the shaft and connected to the movable element of the governor and a bar adjustably connected to the said valve and having an arm engaging the collar.

In testimony whereof I affix my signature in presence of two witnesses.

EDWARD HERR.

Witnesses:
N. E. BJERKE,
I. E. BJERKE.